May 26, 1959
J. W. KICE
2,887,733
HEATING DUCT SYSTEM FOR MOBILE HOUSES
Filed July 27, 1954
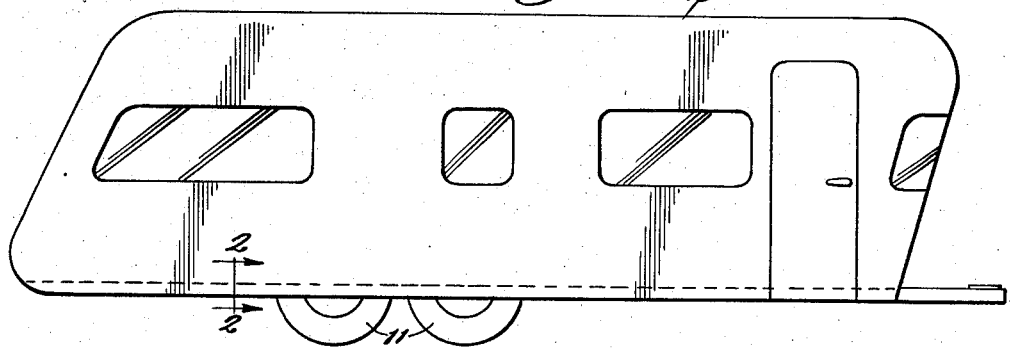
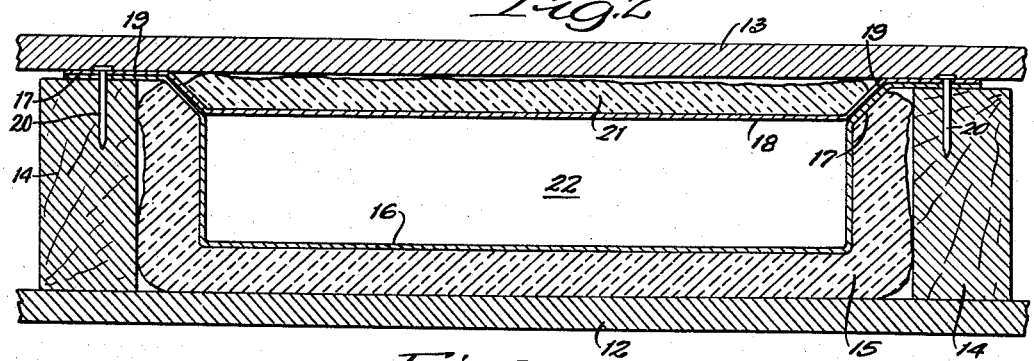
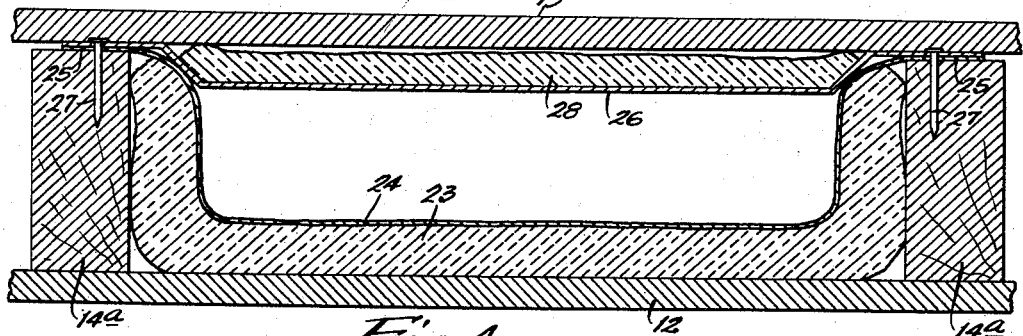
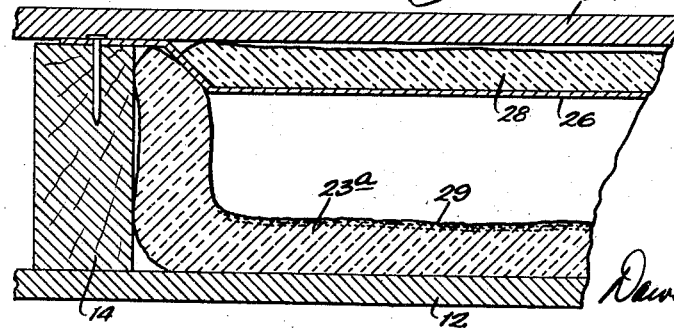
INVENTOR:
Jack Kice,
BY
Dawson, Tilton & Graham,
ATTORNEYS.

United States Patent Office 2,887,733
Patented May 26, 1959

2,887,733

HEATING DUCT SYSTEM FOR MOBILE HOUSES

Jack W. Kice, Wichita, Kans., assignor to The Coleman Company, Inc., Wichita, Kans., a corporation of Kansas Application July 27, 1954, Serial No. 445,988

9 Claims. (Cl. 20—6)

This invention relates to a heating duct system for mobile houses such as trailers, housing units designed to be moved from one area to another, and the like.

In trailers and other forms of mobile houses, the problem of heating the interior or living compartment has been made more difficult by reason of the structural requirements flowing from the fact that the structure is a vehicle or mobile unit, and further from the fact that with the compact structure employed, it is extremely difficult to avoid overheating certain areas while obtaining a deficiency in heat at other points. For example, when the heating conduits are located below the floor and above the subfloor of the trailer, etc., it is found that local overheating of the floor occurs adjacent areas where the conduit is located and a uniform distribution of heat throughout the interior of the structure is not obtained.

An object of the present invention is to provide a simple structure whereby overheating of the floor in areas is avoided while providing means for distributing heated air from a central hot air chamber to various parts of the vehicle interior, with the result that the interior is heated solely by the circulating hot air and thus uniform heating is effected. A further object is to provide a structure of inexpensive and sturdy design whereby heated air is passed below the floor of the mobile house, from which it may be drawn into the interior of the vehicle as desired. Yet another object is to provide in combination with a sleeper floor structure, conduit means adapted to receive heated air and to convey the same through the area below the floor of the vehicle without substantial loss of heat and without substantial heating of the floor above. Other specific objects and advantages will appear as the specification proceeds.

The invention is shown, in an illustrative embodiment, by the accompanying drawing, in which—

Figure 1 is a side elevational view of a trailer or mobile house with which my heating duct system may be employed; Fig. 2, a greatly enlarged sectional view, the section being taken as indicated at line 2—2 of Fig. 1; Fig. 3, a view similar to Fig. 2 but showing a modified form of the invention; and Fig. 4, a view similar to Fig. 3 but omitting the foil shown in Fig. 3.

In the illustration given, 10 designates a trailer or mobile house equipped with wheels 11 and having a subfloor 12. Above the subfloor 12 and at a spaced distance thereabove, is the usual floor panel 13. Sleepers 14 are secured upon the subfloor 12 in spaced-apart relation, as shown more clearly in Fig. 2. Since the foregoing structure is well known in the art, a detailed description herein is believed unnecessary.

In the construction of a trailer or mobile house, it is found highly advantageous to provide a subfloor and a floor panel and between the two to employ beams or structural members. Some of the beams may be in the form of sleepers 14, which may be placed between the floor panels at any selected distance. Since the sleepers 14 may be located without regard to structural considerations, and in desired spaced-apart relation to provide an area adapting it for use as a duct, I prefer to employ in combination with such sleeper or beam structure the duct-forming members which will now be described.

As shown more clearly in Fig. 2, I provide a blanket 15 of insulation and place the same in the U-shaped arrangement shown. The insulation may be of any suitable type or character. I have found that fibrous glass, or the like is particularly useful, however, in the forming of such a U-shaped member, and the position of the U-shaped material can be maintained through the use of a sheet member 16 in the form of a deep channel. The member 16, which may be formed of any rigid material but which is preferably formed of sheet metal, is provided with laterally extending flanges 17 adapted to rest upon the top of the members 14. A second rigid sheet member 18, which is also preferably channeled in a central position so as to rest upon and close the top of the member 16, is provided with laterally extending flanges 19, which rest upon the flanges 17 of the member 16. Nails 20, or other suitable fastening means, may then be passed through the superposed flanges 17 and 19 to secure the structure in the position shown in Fig. 2. A bat 21 of insulating material may then be placed upon the top of the channel 18 and the bat is confined in place by the floor panel 13 thereabove.

In the operation of the structure shown in Figs. 1 and 2, the U-shaped blanket 15 is formed so as to preferably fill the space within the interior of the chamber between the sleepers 14, and while in this position the channel member 16 is located in the position shown in Fig. 2 so as to maintain the blanket 15 in the desired position shown. When the upper channel member 18 is secured in position, it is found that the upper member serves not only as a means of receiving the insulation bat 21, but also it serves as a support which bears against and confines the channel 16 in centered position.

It will be understood that the duct passage 22 formed by the members 16 and 18 and which extends below the panel 13 of the vehicle may communicate with a hot air heating furnace within the trailer 10 or with any other source of heated air, and the duct may also be provided with the usual outlets (not shown) which extend upwardly through the floor panel 13 to different points for discharging heated air into the interior. Since such heating apparatus and duct connections are well known, a detailed description herein is not believed necessary.

In the structure shown in Fig. 3, I dispense with the rigid metal channel 16 and instead employ an insulation bat 23 which itself is in the shape of a U-shaped channel, and secure to the inner surface of the bat a metal foil liner 24. The metal foil liner may be formed of aluminum, tin, or any other suitable material, and is preferably united to the fiber insulation 23 by adhesive or other suitable material. The liner 24 is extended on either side to provide a top flange 25 resting upon the sleepers 14a. A metal or rigid channel sheet 26 similar to the sheet 18 employed in Fig. 2 is now secured in position so as to firmly press the foil edge 25 downwardly against the sleepers 14a, nails 27 or other suitable fastening means being employed. With this structure, the metal foil 24 provides, with the sheet metal member 26, a smooth interior duct surface for receiving the heated air, while, at the same time, the foil flanges 25 serve as a means for suspending not only the foil but the insulating side walls secured thereto. Also the rigid metal channel 26 serves as a spreader to maintain the foil-lined blanket in the desired U-shaped formation. An insulating bat 28 is provided within the rigid channel 26, as shown more clearly in Fig. 3.

While I prefer to employ the foil-equipped insulation 23 as shown best in Fig. 3, for certain uses it may be desired to omit the foil and the structure, without the foil is illustrated in Fig. 4.

Since beams or sleepers are regularly employed between spaced floor channels as a means for strengthening the structure, the present duct system may be provided with a minimum of cost in such a structure so as to utilize the space between the sleepers, and through the parts added it will be noted that the structural advantage of the sleepers is utilized while at the same time providing within the chamber between the sleepers a duct insulated on all sides, while also providing a duct which is sturdily maintained in position under the shocks and other travel effects to which the trailer or mobile house is subjected.

In the structure shown in Fig. 3, the foil-surfaced fibrous glass insulation forms three sides of the duct and it is held in the desired channel shape by contact with the rigid channel plate 26 thereabove. The top bat of insulation 28 is confined in position by the channel sheet 26 and the floor panel 13 thereabove.

In the structure shown in Fig. 4, in which the foil sheet is omitted, it is preferred to spray the inner surface of the glass fibers 23a with a vinyl plastic 29 so as to form a coating thereon. It will be understood that other plastic or coating materials may be used for this purpose.

While, in the foregoing specification, I have set forth specific structures in considerable detail for the purpose of illustrating embodiments of the invention, it will be understood that such details of structure may be varied widely by those skilled in the art without departing from the spirit of my invention.

I claim:

1. In combination with a mobile house having a subfloor with spaced beams thereon and a floor panel extending in covering relation thereover, a U-shaped insulation member lining the bottom and sides of the chamber defined between said beams and subfloor, a rigid channel sheet closing the top of said U-shaped member and having side flanges secured to said beams, and an insulation bat filling the top channel of said channel sheet between the sheet and floor panel.

2. In combination with a mobile house having a subfloor and an upper floor panel and having also spaced beams on the subfloor thereof, a U-shaped insulation blanket lining the bottom and sides of the chamber defined between said beams and subfloor, a substantially smooth surfaced rigid channel member extending downwardly and engaging the sides and bottom of said insulation blanket and having at its top laterally extending flanges resting upon said beams to confine said blanket between said channel member and the bottom and sides of said chamber, a second rigid channel member closing the top of said first channel member and providing therewith a duct, said second channel member having laterally extending flanges extending over the flanges of said first member and above said beams, fastening means extending through said flanges to secure said members to said beams, and an insulation bat received within the channel of said second channel member between that member and said floor panel.

3. The structure of claim 2, in which the upper floor panel forms a closure for the second channel member.

4. In combination with a mobile house having an upper floor and a subfloor and a pair of spaced beams therebetween, a U-shaped insulation blanket received within the space defined between said beams and subfloor and provided on its upper side with a foil sheet, said foil sheet being extended so as to rest upon the tops of said beams, a rigid channel member closing the top of said foil-surfaced insulation blanket and having flanges extending laterally over the marginal edges of said foil sheet, and fastening means securing said flanges and foil to said beams.

5. In a mobile house having vertically spaced floor walls and having spaced-apart sleepers carried by the lower floor wall in the space between said floor walls, an insulation member surfaced at its top with foil and shaped in channel formation within the space defined between said sleepers and the lower floor wall, the foil forming the surface for said member extending laterally and over said beams, and a metal channel member having a lower central portion closing the top of said foil-surfaced member and providing therebetween a duct, said metal channel member having lateral flanges extending over said sleepers and foil, and fastening means extending through said flanges, foil and into said sleepers, and an insulation bat substantially filling said metal channel member throughout the space defined between it and the upper of said floor walls.

6. In combination, a duct adapted to be used between spaced beams, comprising a channel-shaped insulation body, a flexible foil sheet lining the inner side of said insulation body and extending laterally thereof and adapted to rest upon said beams, a metal channel having depending side walls adapted to abut the top walls of said insulation body, and means for securing said foil sheet and flanges together.

7. In combination with a mobile trailer having a floor panel, a subfloor spaced therebelow and spaced apart beams extending therebetween, a generally U-shaped insulation blanket extending along said subfloor and upwardly along the sides of said beams, said insulation blanket having a relatively smooth plastic coating adhering to the inner surface thereof, said coating confining said blanket between said coating and said subfloor and the sides of said beams, a relatively rigid channel member depending downwardly into the space within said generally U-shaped insulation blanket and bearing against the upper ends thereof to confine the same against said beams, said channel member having lateral flanges extending over said beams, fastening means securing said flanges to said beams, and an insulation bat substantially filling the space between said channel member and said floor panel.

8. In a structure of the character described, a trailer having a pair of floors, one being a floor panel and the other being a subfloor spaced therebelow, spaced apart beams carried by said subfloor in interposed relation between the subfloor and floor panel, a generally U-shaped insulation blanket extending along said subfloor and the upturned ends thereof extending along said beams, a relatively rigid channel member depending into the space within said insulation blanket and having side portions urging the upper ends of said blanket against said beams, said channel member having lateral flanges extending over said beams, fastening members extending through said flanges and into said beams to anchor the channel member in position, and an insulation bat within the space defined between said channel member and floor panel.

9. In combination with a mobile house having a subfloor with spaced beams thereon and a floor panel extending in covering relation thereover, a U-shaped insulation member lining the bottom and sides of a chamber between said beams and subfloor, a rigid channel sheet closing the top of said U-shaped member and having side flanges secured to said beams, an insulation bat filling the top channel of said channel sheet between the sheet and floor panel, and a U-shaped surfacing layer for the insides and top of said U-shaped member to confine said U-shaped member between said layer and the bottom and sides of said chamber, said layer presenting a substantially smooth face remote from said channel sheet.

References Cited in the file of this patent

UNITED STATES PATENTS

| | | |
|---|---|---|
| 135,044 | Morden | Jan. 21, 1873 |
| 1,223,801 | Knox | Apr. 24, 1917 |
| 2,128,549 | Zier | Aug. 30, 1938 |
| 2,313,345 | Jones | Mar. 9, 1943 |
| 2,595,613 | Spencer | May 6, 1952 |
| 2,616,529 | MacDonald | Nov. 4, 1952 |

FOREIGN PATENTS

| | | |
|---|---|---|
| 529,107 | France | Nov. 23, 1921 |
| 255,645 | Switzerland | Feb. 1, 1949 |